UNITED STATES PATENT OFFICE.

FREDERICK D. MAISCH, OF PHILADELPHIA, PENNSYLVANIA; MILLICENT FREAS MAISCH EXECUTRIX OF SAID FREDERICK D. MAISCH, DECEASED.

PROCESS FOR MATURING COTTON-BOLLS.

1,317,983. Specification of Letters Patent. Patented Oct. 7, 1919.

No Drawing. Application filed May 19, 1915. Serial No. 29,060.

*To all whom it may concern:*

Be it known that I, FREDERICK D. MAISCH, a citizen of the United States, and resident of Philadelphia, county of Philadelphia, and State of Pennsylvania, have invented an Improvement in Processes for Maturing Cotton-Bolls, of which the following is a specification.

In the production of cotton by the natural growth of the plant and cotton bolls thereof, there are unavoidably developed many conditions which are productive of loss and which greatly interfere with the grade of the cotton produced and the certainty as to time of harvesting, etc. The object of the present invention is to eliminate to a very large extent all of the foregoing and other objectionable conditions and results in the harvesting of cotton as now carried on. In the present method of harvesting, the cotton develops under the proper atmospheric conditions with the lower bolls maturing first, then the bolls higher up on the plant, and so on to the upper bolls, this condition requiring usually three or more pickings, the cotton being picked from the fibrous outer shell leaving the latter upon the plant. As the development in different plants may be affected considerably by differences in the conditions of the ground and other conditions as to special locations above the ground modifying the atmospheric influences, the time of harvesting the ultimate output is variable and involves great care and attention to prevent losses from overlooking immature bolls, and moreover, frost-bitten bolls which are liable to occur with the latest maturing, when frost conditions frequently occur.

By my improved method, the harvesting of the cotton may be definitely and intelligently performed without waiting upon ultimate final maturing conditions, such as have been expected of nature's efforts, and instead enable the cotton bolls to be cut from the plant irrespective of whether they are opened or not, and then subjecting these bolls to a definite treatment which speedily and positively matures the cotton with definitely assured results. The green cotton bolls may be picked from the stalk at a considerable period before the time that they would open by natural conditions, and these may be, by my improved process, quickly developed into a beautiful bloom, producing whiter cotton, of a better and stronger staple and cleaner than ever produced under natural or nature's conditions. My improved process is equally advantageous in developing frost-bitten and tail end crops where they occur, but it is manifest that if the process is carefully followed with the maturing crop of bolls, all of the bolls may be brought to maturity and into beautiful bloom without there being any bolls to remain to be frost bitten or to constitute tail end crops. The losses heretofore by frost and tail end crops are believed to be approximately ten per cent. of the cotton crop, but by this improved process these losses may be entirely eliminated. Among other advantages of my improved process, it may be pointed out that the period required to bring a crop of cotton into full maturity for the commercial market is considerably reduced, and therefore reduces the cost and permits the use of the farms for intermediate crops to a greater extent; further, the maturing being facilitated, the opportunity of the boll weevil to work destruction is materially removed; the discoloration of the cotton which so frequently occurs in the ordinary production may be entirely eliminated so that all the cotton may be of the highest grade or staple. In other words, the cotton produced is cleaner and is standardized so that a uniform quality can be relied upon.

In the present methods of maturing cotton on the farms, the action of the sun's rays is an important factor, and aside from these being irregular in their quality, owing to varying atmospheric conditions, the tendency of the sun's rays is to injure mature cotton in two ways, namely, to produce a chemical action upon the fiber in such a manner that it is overdried and weakened by becoming more brittle, and also to produce a solvent action upon the seeds which produces discoloration in the more mature bolls and produce tinged cotton or what is known or classed as "blue cotton". By my improved process, the sunlight is preferably entirely eliminated in the maturing operation so that the destructive action of the over-development of the cotton boll by the sun's rays is prevented and all of the cotton produced is of the highest grade, irrespective of whether the bolls when cut from the stalk were of different degrees of maturity. By my improved process, a very immature boll may be developed into one of full maturity in an exceedingly short period of time, whereas one nearer full maturity would require proportionately less time, but in each case the cotton boll produced will have the highest staple or quality that could be desired.

Considering the foregoing objects and results to be accomplished, my improved process consists of subjecting the immature cotton bolls, when cut from the plant, to the action of a relatively high temperature and preferably in subdued light and away from the direct action of sunlight. In the preferred process, the immature bolls are placed in an oven or compartment where they are raised in temperature considerably above that of the normal atmosphere and desirably temperatures from 120° Fahr. to 225° Fahr., according to the speed of maturing required and according to the degree of immaturity of the boll to be treated. In other words, the boll which is nearly matured and ready to burst may be brought to full maturity in a short space of time by subjecting it to a dry heat of approximately 120° Fahr., whereas a very immature boll might require 175° Fahr. or more temperature to bring it to a state of full maturity in the same or approximately the same period of time. I have found that the higher the temperature the more rapidly does the boll mature, but care must be had not to increase the temperature so high as to cause an undue softening and diffusion of the substance of the seeds, as such action would have a tendency to discolor the cotton. I have found that all bolls may be matured without producing any discoloration of the cotton by exercising reasonable judgment in avoiding too high a temperature for the particular maturity of the boll being treated.

The immature boll contains a large proportion of moisture, and when sealed, this moisture is on the interior among the cotton fiber and the seeds, and so long as the boll is sealed this moisture will remain unevaporated. When the boll is subjected to the action of dry heat, the result is to shrink the outer shell sections between the longitudinal lines of union causing the said sections to curl outward adjacent to said lines of union. This curling is facilitated by the fact that the interior of the shell of the boll is moist, whereas the outer portion is being thoroughly dried. The curling action involving shrinkage or contraction of the intermediate sections of the shell, finally separates the shell sections along the lines of union and the boll bursts with a liberation of the cotton. This action is facilitated by the temperature which is applied to the boll inasmuch as said shell tends to expand the moisture which is within the boll, and this pressure assists in forcing the shell sections apart. Furthermore, the liberation of the cotton permits the expansion of the moisture to rapidly take place and the cotton fibers are forced apart by the elimination of the moisture due to the application of the heat and producing a bloom of the most beautiful character without the least injury to the fiber. Under this process, the fibers can at no time be subjected to excessive drying, and therefore retain their best staple qualities. There is no danger from overheating, as the matured cotton may be removed as fast as it becomes in full bloom. Furthermore, any lengthened period of temperature action is not detrimental to the fiber, because of the natural moisture which is ever present in bolls being matured, and while this moisture becomes gradually less in the maturing boll, once the shell is open, the subsequent treatment is relatively so short that injury to the fiber cannot result from the temperature employed. Furthermore, the moisture which is present in the boll acts to protect the seed from becoming dissolved in a manner to discolor the cotton, and therefore a reasonably high temperature may be maintained for the full period required to mature the cotton without any liability to deleterous results. The excessive moisture which may accumulate may be vented or allowed to pass away in any convenient manner. While I have found dry heat to be most suitable for the carrying on of the process, I do not restrict myself to the particular manner of heating the bolls. I prefer, however, to place the bolls in suitable drying kilns or ovens wherein they may be subjected to heat produced exteriorly and transmitted into or through the kiln or oven. Any suitable means for introducing the immature bolls and removing the mature bolls may be employed. By employing a practically dry heat in which the bolls are to mature, it is manifest that the shrinking of the outer surface of the shells would be more rapidly accomplished than where a moist heat is employed, and moreover it is also evident that when the bolls burst, the contained moisture therein will be more rapidly eliminated from the cotton fiber where an excessive moisture is not maintained in the oven or kiln, and it is therefore preferable that the kiln or oven be maintained in as dry a condition as is reasonably consistent with the practice of the process.

While I have described my invention in its greatest simplicity as involving heat (preferably dry heat) under reasonably controlled conditions in treating the bolls, this process may be supplemented, if desired, by secondary or subsidiary steps for assisting in the drying and in the removal of the moisture, such as by the use of suitable moisture absorbing substances or otherwise, but these are not essential to the germane feature of the invention.

Having now described my invention, what I claim as new and desire to secure by Letters Patent, is:—

1. The herein described method of maturing immature or frost-bitten cotton bolls, which consists in severing the boll from the plant while in an immature condition, subjecting the immature cotton boll to a heated atmosphere greater than 100° Fahrenheit and thereby contracting the shell of the cotton boll and causing it to open to liberate the cotton, and expanding the cotton by evaporating the moisture therein under the continued application of the heat.

2. The herein described method of maturing immature or frost-bitten cotton bolls, which consists in severing the boll from the plant while in an immature condition, subjecting the immature cotton boll to a heated atmosphere greater than 100° Fahrenheit while maintaining the boll in a subdued light out of the influence of the direct rays of the sun and thereby contracting the shell of the cotton boll and causing it to open to liberate the cotton, and expanding the cotton by evaporating the moisture therein under the continued application of the heat.

3. The herein described method of maturing immature or frost-bitten cotton bolls, which consists in severing the boll from the plant while in an immature condition, subjecting the immature cotton boll to a heated atmosphere greater than 100° Fahrenheit and of a less temperature than will dissolve the coloring matter of the seeds of the boll and thereby contracting the shell of the cotton boll and causing it to open to liberate the cotton, and expanding the cotton by evaporating the moisture therein under the continued application of the heat.

4. The herein described method of maturing immature or frost-bitten cotton bolls of various degrees of maturity, which consists in severing the bolls from the plants and subjecting said immature bolls to the action of artificial heat and thereby contracting the outer shells to liberate the cotton, applying a higher degree of artificial heat to those of the bolls which are the least matured than is applied to those of the greatest maturity, whereby all of the bolls are brought to maturity with approximately the same length of treatment, and expanding the fibers of the cotton by evaporating the moisture contained therein by the continued action of the heat.

5. The herein described method of maturing immature or frost-bitten cotton bolls, which consists in removing the immature bolls from the plants, and subjecting the bolls to an atmosphere of artificial heat and thereby contracting the shells of the bolls and opening the same to liberate the cotton.

6. The herein described method of maturing immature or frost-bitten cotton bolls, which consists in removing the immature bolls from the plants, subjecting the bolls to an atmosphere of artificial heat and thereby contracting the shells of the bolls and opening the same to liberate the cotton, and expanding the fiber of the cotton and evaporation of the surplus moisture of the same by the continued action of the artificial heat.

7. The herein described method of maturing immature or frost-bitten cotton bolls, which consists in removing the cotton bolls from the plants and subjecting the same to the action of artificial heat sufficient to contract and burst the shells of the bolls and liberate the cotton, and expanding the fibers of the cotton and removing the surplus moisture therefrom by maintaining the open bolls in the atmosphere of artificial heat until the boll has fully bloomed.

8. The herein described method of maturing immature or frost-bitten cotton bolls, which consists in removing the cotton bolls from the plants and subjecting the same to the action of artificial heat sufficient to contract and burst the shells of the bolls and liberate the cotton, expanding the fibers of the cotton and removing the surplus moisture therefrom by maintaining open bolls in the atmosphere of artificial heat until the boll has fully bloomed, and restricting the temperature of the heat to a less temperature than one which will cause the coloring matter of the seeds to be dissolved.

9. The herein described process of maturing immature cotton bolls, which consists in detaching the bolls from the plant before they have matured, artificially contracting the fiber of the shell of the detached bolls and thereby causing the shells thereof to open, and thereafter drying the released fibers of the cotton of the said bolls and expanding it into a natural state of full bloom.

10. The herein described process of maturing immature or frost bitten cotton bolls, which consists in artificially contracting the fiber of the shell of a cotton boll, and next expanding the fibers of the cotton contained therein into a natural state.

11. The process of maturing immature or frost bitten cotton bolls, which consists in artificially and gradually contracting the exterior of the boll, so as to open the same, and simultaneously expanding the fibers of the cotton into their natural or matured condition.

12. The process of maturing immature cotton bolls, consisting in artificially opening out the shell of the boll and gradually expanding the fibers of the immature cotton to induce a mature state of said fibers.

13. The herein described process of maturing immature or frost bitten, detached, cotton bolls, which consists in artificially contracting the outer fibers of the shell of a cotton boll and expanding the fibers of the cotton contained therein into a natural or matured state.

In testimony of which invention, I hereunto set my hand.

FREDERICK D. MAISCH.

Witnesses:
GORDON JOEL SAXON,
MILLICENT F. MAISCH,
JULIA A. DORSEY.

Copies of this patent may be obtained for five cents each, by addressing the "Commissioner of Patents, Washington, D. C."